United States Patent [19]

Winter

[11] 4,355,137

[45] Oct. 19, 1982

[54] RECOVERY OF HEAVY METALS FROM SOLUTION BY EXTRACTION WITH CROSS-LINKED VEGETABLE PROTEIN

[75] Inventor: George Winter, Beaumaris, Australia

[73] Assignee: Commonwealth Scientific and Industrial Research Organization, Campbell, Australia

[21] Appl. No.: 202,006

[22] Filed: Oct. 29, 1980

Related U.S. Application Data

[63] Continuation-in-part of Ser. No. 84,614, Oct. 15, 1979, Pat. No. 4,261,819.

[30] Foreign Application Priority Data

Oct. 16, 1980 [AU] Australia .............................. 63282/80

[51] Int. Cl.$^3$ ............................................. C08L 89/00
[52] U.S. Cl. ................................... 525/54.1; 527/205; 521/30; 210/683; 210/688; 210/731
[58] Field of Search .............. 260/6; 521/30; 210/688, 210/683, 731; 525/54.1; 527/205

[56] References Cited

U.S. PATENT DOCUMENTS

| | | | |
|---|---|---|---|
| 3,925,192 | 12/1975 | Randall et al. | 210/688 |
| 3,944,415 | 3/1976 | Randall et al. | 210/688 |
| 3,979,286 | 9/1976 | Wing et al. | 210/688 |
| 4,051,316 | 9/1977 | Wing et al. | 210/731 |
| 4,083,783 | 4/1978 | Wing et al. | 210/688 |
| 4,289,531 | 9/1981 | Lechavelier et al. | 210/688 |
| 4,293,334 | 10/1981 | Drobot et al. | 210/688 |

*Primary Examiner*—John Kight, III
*Assistant Examiner*—Nathan Nutter
*Attorney, Agent, or Firm*—Murray & Whisenhunt

[57] ABSTRACT

The present invention relates to a method of abstracting heavy metal ions from solution by contacting the solution containing heavy metal ions with a cross-linked vegetable protein, or a mixture of cross-linked vegetable proteins. The method may be used to separate a mixture of heavy metal ions in solution by selectively abstracting a particular heavy metal ion by contacting the particular heavy metal ion with a selected cross-linked vegetable protein.

Preferred vegetable proteins are derived from wheat, rape seed, safflower seed, sun-flower seed or soya bean.

7 Claims, No Drawings

RECOVERY OF HEAVY METALS FROM SOLUTION BY EXTRACTION WITH CROSS-LINKED VEGETABLE PROTEIN

This is a Continuation-in-Part of application Ser. No. 84,614 filed Oct. 15th, 1979, which is now U.S. Pat. No. 4,261,819.

This invention relates to ion-exchange materials for the recovery of heavy metals from solution and to methods of heavy metal recovery based on the use of such materials. The invention is also concerned with separating a mixture of heavy metal ions in solution.

In the recovery of metals from solutions, it is known to use ion exchange materials of both synthetic and natural origin. Ion exchange materials derived from natural products are a commercially attractive possibility and a number of materials based essentially on carbohydrates have been examined. Of these, xanthates of starch and cellulose in particular have been proposed for the removal of metal ions from waste liquors. Natural proteins in living organisms are also known to be able to abstract heavy metal ions from dilute solutions.

In prior Specification No. 84,614 which is now U.S. Pat. No. 4,261,819 in the name of the present applicant it was disclosed that cross-linked casein could be used for the abstraction of heavy metal values from industrial waters.

Casein is a commercially available and relatively inexpensive protein derived from milk, that is, it is an animal-derived protein. Chemically, it may be regarded as a polyfunctional ion exchanger in which phosphoric, carboxylic, phenoxy and amino groups are the main active groups.

Casein however is soluble in water above pH 7 and the prior specification disclosed that in order to obtain an insoluble material, some cross-linking of the casein is necessary. Cross-linking of casein is a well-known procedure and may be carried out, for example, by treatment with an aldehyde to provide an insoluble product which may then be used in the method of the invention disclosed in the prior specification as an ion exchange material for abstraction of metal values from solutions. A preferred method of cross-linking casein disclosed in the prior specification comprises the use of formaldehyde as a cross-linking agent.

The prior specification also disclosed that cross-linked casein was capable of selectively removing heavy metal ions from solution, and that the selectivity of cross-linked casein for heavy metal ions may be increased by thiolation, i.e. the introduction of thiol groups into the cross-linked material.

We have now found that in addition to cross-linked casein other cross-linked proteins, in particular cross-linked plant or vegetable-derived proteins (hereinafter referred to as "cross-linked vegetable proteins") are suitable for abstracting heavy metals from solution. These cross-linked vegetable proteins provide an alternative to cross-linked casein and may have advantages under certain circumstances such as cost and sometimes greater adsorption efficiency for certain metals. Within the vegetable proteins exemplified in Table 1 of the present specification, it is readily apparent the certain vegetable proteins are more efficient at abstracting certain metal values from solution.

Therefore, the present invention relates in general to the use of cross-linked vegetable proteins for abstraction of heavy metal ions from industrial waters.

According to one aspect of the present invention there is provided a method of abstracting heavy metal ions from solution in which a solution containing heavy metal ions is brought into contact with cross-linked vegetable protein.

According to a further aspect of the present invention there is provided a method of separating a mixture of heavy metal ions whereby a solution containing at least two heavy metal ions is brought into contact with a cross-linked vegetable protein under conditions such that one of said heavy metal ions is selectively adsorbed onto said cross-linked vegetable protein.

Preferably the solution is brought into contact with the cross-linked vegetable protein at a predetermined pH. For divalent cations preferable pH values range from 4 to 8, whereas for the trivalent cations preferable pH values may be as low as 2. For anions pH values of less than about 4 are preferred.

Selective adsorption of heavy metal ions from solution is dependent on the pH of the solution. Thus for instance, divalent heavy metal cations may be separated from heavy metal anions by passing a solution containing such ions through a cross-linked vegetable protein bed at a pH of between 2 and 3.

The invention also provides ion exchange materials, comprising cross-linked vegetable protein and method of preparing same.

Vegetable proteins which are suitable for use in the present invention include, for example, the proteins derived from wheat (gluten), rape seed, safflower seed, sun-flower seed and soya bean. These vegetable proteins which, after being cross-linked, are used in accordance with the present invention are commercially available and are relatively inexpensive, thus making their use desirable. Chemically, the vegetable proteins may be regarded as polyfunctional ion exchangers in which phosphoric, carboxylic, phenoxy and amino groups are the main active groups.

Suitable pH values for the adsorption of a single metal ion can be determined from a consideration of the nature of the metal ions and the way in which charged metal ions react in solutions of different pH values. The phosphoric, carboxylic and phenoxy groups of the vegetable proteins provide the sites for adsorption of the metal cations and the amino groups of the vegetable proteins provide the sites for adsorption of anions.

The adsorption of metal cations can be exemplified by the reaction of carboxyl groups.

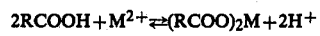

$$2RCOOH + M^{2+} \rightleftharpoons (RCOO)_2M + 2H^+$$

whereas the adsorption of anions is exemplified by the reaction with amino groups

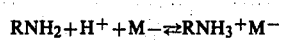

$$RNH_2 + H^+ + M^- \rightleftharpoons RNH_3^+ M^-$$

Therefore adsorption of metal cations will be favoured by a high pH and the adsorption of metal anions will be favoured by a low pH.

A further factor influencing the amount and nature of the metal ion adsorbed and of the efficiency of the adsorption method of the present invention is the valency of the metal ion being adsorbed. Trivalent metal ions are adsorbed by the vegetable proteins in the method of the present invention more strongly than are divalent metal ions, which in turn are adsorbed more strongly than are univalent ions. Univalent ions are almost always adsorbed very slightly and this adsorption is negligible when compared to the amount of divalent and trivalent metal ions adsorbed. Further by a combination of the effects the pH of the abstracting solution and of the valency of the ion being abstracted it is possible to establish a first set of conditions which will selectively adsorb a first type of metal ion in an efficient manner, and then by affecting the pH value of the solution to a second set of conditions to selectively adsorb a second type of metal ion from solution in an efficient manner.

It has also been found that it is not necessary to separate the vegetable protein from non-protein material, for example, non-protein material which makes up the various components of the seed meal. It is also within the scope of the present invention to thiolate the vegetable proteins after they have been cross-linked. Thiolation may be effected in the manner disclosed in the prior specification.

The invention is further described and illustrated by the following non-limiting examples which set out preferred methods of preparing cross-linked vegetable proteins and show their respective use as ion exchangers for abstraction of heavy metal ions from solution or selectively separation of a mixture of heavy metal ions in solution.

The preparation of cross-linked vegetable proteins is illustrated in Examples 1 and 2.

EXAMPLE 1

Preparation of Cross-Linked Gluten 100 gm of wheat gluten was suspended in 400 ml of water. To this mixture was added 9 gm of 30% aqueous formaldehyde solution. The resultant mixture was allowed to stand for two days and was then washed with water. The cross-linked gluten was separated by filtration and dried.

EXAMPLE 2

Preparation of Cross-Linked Rape Seed Meal, Safflower Seed Meal, Sun-Flower Seed Meal and Soya Bean Meal The seed meals were separated into four size fractions (see Table 1) by sieving through the appropriate sieves.

Each of the fractions was cross-linked in the manner described in Example 1.

The use of the cross-linked vegetable protein fractions prepared in Example 1 or 2 for the abstraction of various metal ions is illustrated in Examples 3 to 5:

EXAMPLE 3

Adsorption of Chromate Anion (a) 1 gram of the adsorbent was suspended in 1 liter of chromate solution of concentration equal to 300 p.p.m. Cr(VI) and adjusted to a pH of approximately 2.5. The suspensions were allowed to stand for 48 hours and the final pH recorded. The adsorbent was then separated by filtration and the Cr(VI) extracted with ammonia solution to determine the amount of Cr(VI) that had been adsorbed. The amounts adsorbed by the various protein fractions tested as adsorbents are indicated in column 4 of Table 1.

(b) 1 gram of adsorbent was suspended in 100 ml of chromate solution having a concentration equal to 15000 p.p.m. Cr(VI) and adjusted with ammonia solution to a pH of approximately 2.5. The amount of Cr(VI) adsorbed was then determined as desscribed in (a). The amounts adsorbed by each of the protein fractions tested are indicated by column 6 of Table 1.

EXAMPLE 4

Adsorption of Copper 1 gram of adsorbent was suspended without pH adjustment in 100 ml of copper chloride having a concentration equal to 15000 p.p.m. of copper. The suspension was allowed to stand for 48 hours, the absorbents removed by filtration and the adsorbed copper extracted with hydrochloric acid. The results obtained are indicated in column 8 of Table 1.

EXAMPLE 5

Adsorption of Cobalt, Lead and Mercury

Amounts of 1 gram of adsorbent were suspended without pH adjustment in solutions of cobalt chloride, lead nitrate or mercury nitrate whose concentrations were equal to 3000 p.p.m. of the metal. The suspensions were allowed to stand for 48 hours, the adsorbent was separated by filtration. The adsorbed cobalt was extracted with hydrochloric acid and the lead and the mercury with nitric acid. The amount of cobalt, lead and mercury adsorbed by the various size fractions tested are indicated in columns (10), (12) and (14) respectively of Table 1.

TABLE

| (1) Particle Size BSS | (2) Moisture % | (3) Nitrogen % | (4) 300ppm CrVI % | (5) 300ppm CrVI pH | (6) 15000ppm CrVI % | (7) 15000ppm CrVI pH | (8) 15000ppm Cu % | (9) 15000ppm Cu pH | (10) 30000ppm Co % | (11) 30000ppm Co pH | (12) 30000ppm Pb % | (13) 30000ppm Pb pH | (14) 30000ppm Hg % | (15) 30000ppm Hg pH |
|---|---|---|---|---|---|---|---|---|---|---|---|---|---|---|
| GLUTEN | | | | | | | | | | | | | | |
|  | 5.4 | 13.1 | 1.9 | 2.6 | 4.3 | 2.6 | 1.5 | 4.4 | 1.2 | 5.8 | 6.1 | 4.9 | 37.8 | 3.7 |
| RAPE SEED MEAL | | | | | | | | | | | | | | |
| >16 |  | 5.0 | 2.4 | 2.7 | 4.8 | 2.9 | 1.2 | 3.9 | 3.6 | 5.3 |  |  |  |  |
| 16-30 | 5.2 | 4.9 | 2.3 | 2.7 | 4.7 | 2.9 | 1.6 | 3.9 |  |  | 8.0 | 4.4 | 29.3 | 3.0 |
| 30-72 |  | 4.9 | 2.5 | 2.7 | 4.3 | 2.8 | 1.3 | 3.9 |  |  |  |  |  |  |
| <72 |  | 5.5 | 2.8 | 2.7 | 4.6 | 2.8 | 1.1 | 3.9 |  |  |  |  |  |  |
| SAFFLOWER SEED MEAL | | | | | | | | | | | | | | |
| <16 |  | 2.1 | 0.8 | 2.6 | 2.9 | 2.8 | 1.4 | 4.0 | 2.0 | 5.3 |  |  |  |  |
| 16-30 | 2.1 | 2.3 | 0.9 | 2.6 | 2.6 | 2.8 | 1.2 | 4.0 |  |  | 6.0 | 4.6 | 19.7 | 3.2 |
| 30-72 |  | 5.6 | 1.2 | 2.6 | 3.5 | 2.8 | 1.7 | 4.0 |  |  |  |  |  |  |
| <72 |  | 7.4 | 2.3 | 2.6 | 4.4 | 2.8 | 1.5 | 4.0 |  |  |  |  |  |  |
| SUNFLOWER SEED MEAL | | | | | | | | | | | | | | |
| >16 |  | 4.1 | 1.5 | 2.6 | 4.4 | 2.7 | 3.1 | 4.0 | 4.3 | 5.3 |  |  |  |  |
| 16-30 | 3.3 | 4.7 | 1.5 | 2.6 | 2.9 | 2.9 | 2.8 | 4.0 |  |  | 8.1 | 4.6 | 23.7 | 3.2 |
| 30-72 |  | 5.3 | 1.8 | 2.5 | 3.8 | 3.8 | 3.1 | 4.0 |  |  |  |  |  |  |

TABLE-continued

| (1) Particle Size BSS | (2) Moisture % | (3) Nitrogen % | (4) 300ppm CrVI % | (5) pH | (6) 15000ppm CrVI % | (7) pH | (8) 15000ppm Cu % | (9) pH | (10) 30000ppm Co % | (11) pH | (12) 30000ppm Pb % | (13) pH | (14) 30000ppm Hg % | (15) pH |
|---|---|---|---|---|---|---|---|---|---|---|---|---|---|---|
| | | | | | Adsorption of metals (% by weight of adsorbent) from solutions containing | | | | | | | | | |
| <72 | | 6.1 | 1.8 | 2.6 | 3.4 | 3.4 | 2.7 | 4.0 | | | | | | |
| SOYA BEAN MEAL | | | | | | | | | | | | | | |
| >16 | | 7.6 | 3.0 | 2.4 | 4.9 | 2.7 | 3.2 | 4.0 | 3.5 | 5.9 | | | | |
| 16–30 | 5.98 | 7.8 | 3.1 | 2.4 | 4.7 | 2.7 | 3.2 | 4.0 | 3.8 | 5.7 | 7.7 | 4.7 | 33.5 | 3.2 |
| 30–72 | | 7.2 | | | 4.7 | 2.7 | 2.0 | 4.0 | | | | | | |
| <72 | | 7.9 | 2.8 | 2.6 | 3.7 | 2.7 | 2.0 | 4.0 | | | | | | |

The results indicated Table 1 above illustrate the use of cross-linked vegetable proteins in accordance with the present invention. In Table 1, column 1 shows the four different size ranges of the selected cross-linked vegetable proteins which were studied. The amounts of metal ion adsorbed onto the adsorbent, expressed as a percentage by weight of adsorbent, are given in columns (4), (6), (8), (10), (12) and (14) for each of the metal concentrations tested. The pH of the solution for each metal ion concentration is given at columns (5), (7), (9), (11), (13) and (15).

It is accordingly to be understood that the invention is in no way limited to processes described and exemplified herein and that many variations will fall within the spirit and scope of the invention which includes every novel feature and combination of novel features herein disclosed.

I claim:

1. A method of abstracting heavy metal ions from solution in which a solution containing heavy metal ions is brought into contact with a cross-linked vegetable protein.

2. A method according to claim 1 wherein the vegetable protein is cross-linked with formaldehyde.

3. A method of separating a mixture of heavy metal ions whereby a solution containing at least two heavy metal ions is brought into contact with a cross-linked vegetable protein under conditions such that one of the said heavy metal ions is selectively adsorbed onto said cross-linked vegetable protein.

4. A method according to any one of claims 1 to 3 wherein said vegetable protein is derived from wheat, rape seed, safflower seed, sun-flower seed or soya bean.

5. A method according to claim 4 wherein said vegetable protein is gluten.

6. A method according to any one of claims 1, 2 or 3 wherein said vegetable protein is in the form of a seed meal.

7. A method according to any one of claims 1, 2 or 3 in which the cross-linked vegetable protein is thiolated.

* * * * *